(12) United States Patent
Griffin et al.

(10) Patent No.: US 9,243,622 B2
(45) Date of Patent: Jan. 26, 2016

(54) BELLOWS SYNTHETIC JET

(71) Applicant: The Boeing Company, Chicago, IL (US)

(72) Inventors: Steven Griffin, Kihei, HI (US); Edward A. Whalen, St. Louis, MO (US); Shawn Haar, Kihei, HI (US)

(73) Assignee: The Boeing Company, Chicago, IL (US)

( * ) Notice: Subject to any disclaimer, the term of this patent is extended or adjusted under 35 U.S.C. 154(b) by 274 days.

(21) Appl. No.: 13/899,754

(22) Filed: May 22, 2013

(65) Prior Publication Data

US 2014/0348668 A1   Nov. 27, 2014

(51) Int. Cl.
| | |
|---|---|
| *B64C 21/00* | (2006.01) |
| *F04B 43/00* | (2006.01) |
| *F15D 1/00* | (2006.01) |
| *B64C 21/02* | (2006.01) |
| *B64C 21/08* | (2006.01) |

(52) U.S. Cl.
CPC .............. *F04B 43/00* (2013.01); *B64C 21/025* (2013.01); *B64C 21/08* (2013.01); *F15D 1/0095* (2013.01); *B64C 2230/18* (2013.01)

(58) Field of Classification Search
CPC ....... F04B 43/00; B64C 21/025; B64C 21/08; B64C 2230/18; B64C 2230/04; B64C 2230/06; B64C 2230/02; F15D 1/0095
See application file for complete search history.

(56) References Cited

U.S. PATENT DOCUMENTS

| | | | |
|---|---|---|---|
| 5,690,165 A | 11/1997 | Roth et al. | |
| 6,722,581 B2 * | 4/2004 | Saddoughi | 239/102.2 |
| 7,733,549 B2 * | 6/2010 | Sugahara | 359/223.1 |
| 8,016,244 B2 * | 9/2011 | Shmilovich et al. | 244/199.3 |
| 2006/0185822 A1 * | 8/2006 | Glezer et al. | 165/80.3 |
| 2008/0087771 A1 | 4/2008 | Boespflug | |
| 2010/0071773 A1 * | 3/2010 | Whalen | 137/2 |
| 2012/0153041 A1 * | 6/2012 | Ternoy et al. | 239/102.2 |
| 2012/0170216 A1 | 7/2012 | Arik et al. | |

FOREIGN PATENT DOCUMENTS

WO   WO 2011077424 A1 *   6/2011

OTHER PUBLICATIONS

Shaw, Leonard L., et al., "Active Control of a Pod Wake-Mid-Scale Application", 43$^{rd}$ AIAA Aerospace Sciences Meeting and Exhibit, Jan. 10-13, 2005, 10 pgs.
European Application Serial No. 14168234.4, Search Report mailed Oct. 23, 2014, 7 pgs.

* cited by examiner

*Primary Examiner* — Philip J Bonzell
*Assistant Examiner* — Michael Kreiner
(74) *Attorney, Agent, or Firm* — Kwan & Olynick LLP

(57) ABSTRACT

A device for generating a synthetic jet is described. The device can include a flap, an actuator coupled to the flap and a chamber including an aperture. The flap forms a portion of the chamber. The flap is configured to oscillate in a flapping motion such that fluid is alternately drawn into the chamber via the aperture and expelled from the chamber via the aperture to form the synthetic jet. In some embodiments, multiple flaps can be used on a device to generate the synthetic jet.

18 Claims, 6 Drawing Sheets

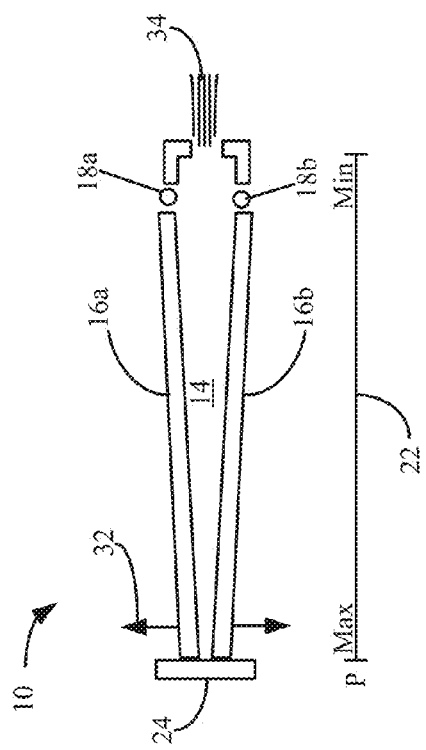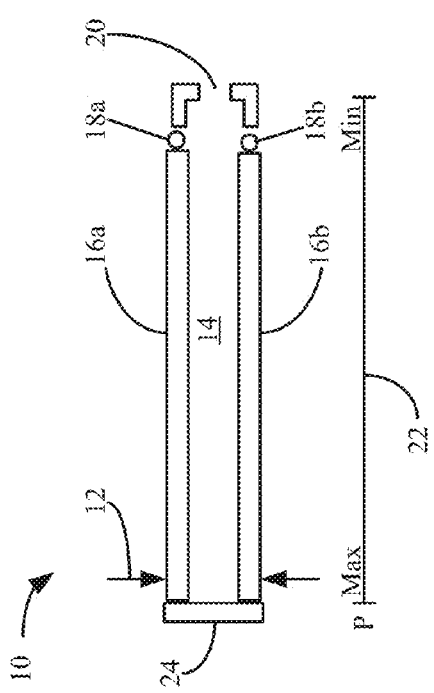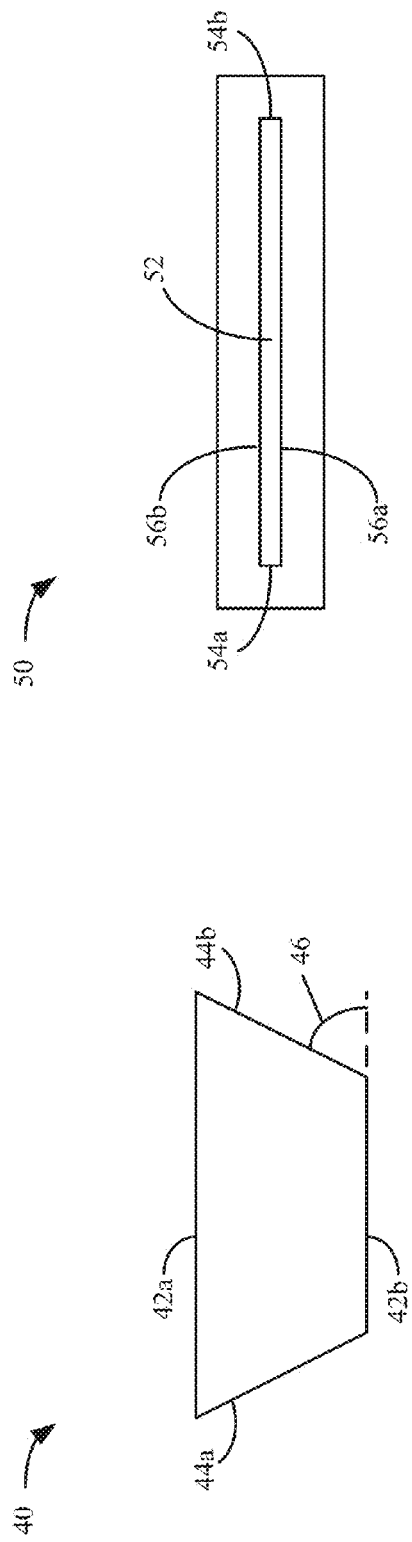

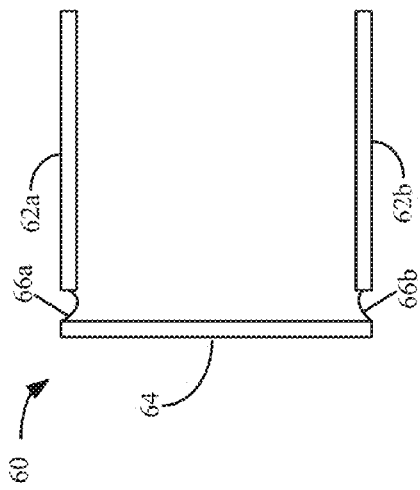
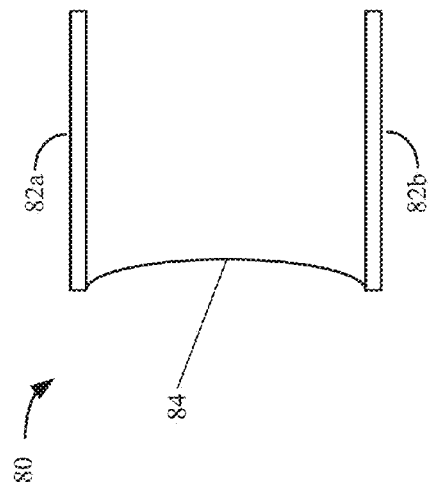
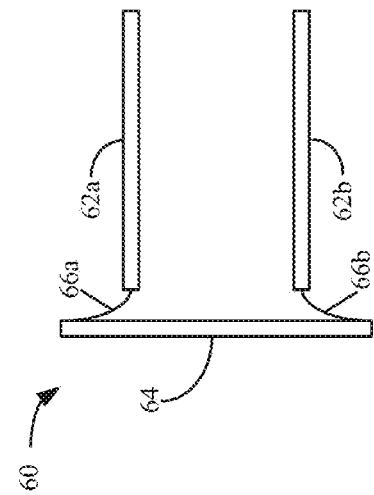
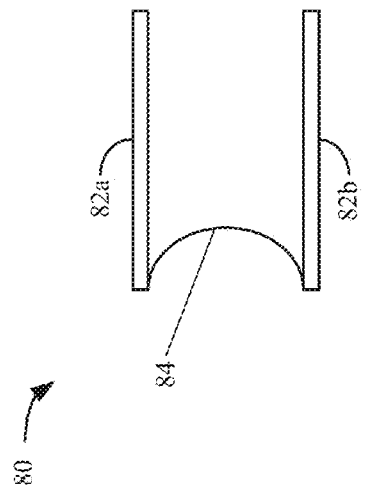

BELLOWS SYNTHETIC JET

BACKGROUND

A synthetic jet is generated by alternating momentary ejection and suction of a fluid across an orifice such that the net mass flux is zero. A typical configuration for a device used to generate a synthetic jet is to place a biomorph piezoelectric disk at the bottom of a cylinder. The cylinder includes a small orifice opposite the piezoelectric disk. The effect of the bending disk is to actuate like a piston head to generate ejection and suction through the orifice. In response to the motions, vortices are generated which propagate away from the orifice. The synthetic jet is formed when the vortices generated by the orifice coalesce to form a jet, in a time-averaged sense.

A synthetic jet actuator can be deployed in a flow control system. A unique feature of synthetic jets is that they are formed entirely from the working fluid of the flow system. Thus, the jets can be used to transfer linear momentum to the flow system without a net injection of mass.

Synthetic jets can be produced over a broad range of length and time-scales. Thus, synthetic jets have been proposed for a broad range of flow control applications. For example, synthetic jet actuators have been proposed as a mechanism for affecting flow separation over a wing. In addition, the synthetic jet actuators are also used as a mechanism for providing focused cooling.

In designing a mechanism for producing a synthetic jet, issues that are considered are the amount linear momentum that is produced per unit of weight of the mechanism and/or per unit power input for the mechanism. These ratios provide some measures of the efficiency of the device. For current synthetic jet designs, such as the piston design described above, the efficiency of the designs limit their applicability for weight and/or power sensitive applications, such as aircraft. In view of the above, new apparatus and methods for generating synthetic jet actuators are desired.

SUMMARY

A device for generating a synthetic jet is described. The device can be generally characterized as including 1) a flap where the flap is hinged on one end to allow the flap to rotate about a hinge as part of a flapping motion, 2) an actuator coupled to flap configured to cause the flapping motion and 3) a chamber including an aperture where a portion of the chamber is formed from the flap. The flap is configured such that the flapping motion alternately causes a fluid to be drawn into the chamber via the aperture and expelled from the chamber via the aperture such that the synthetic jet is emitted from the aperture. The flap can be driven at high frequencies (e.g., hundreds or thousands of cycles per second). As is described below, the device can be referred to as a bellows synthetic jet because the flapping motion is similar to the motion of a fireplace bellows.

The flapping motion can cause a pressure distribution to form which increases from a minimum value at approximately the aperture to a maximum value near a back of the chamber opposite the aperture. The flap can be hinged such that portions of the flap with greatest range of motion are located in portions of the chamber near the maximum value of the pressure distribution. In particular embodiments, the flap can be rectangularly or trapezoidally shaped. The trapezoid shape can cause a funneling effect which may increase the efficiency of the device.

Another aspect of the described embodiments can include a device for generating a synthetic jet including multiple flaps. In one embodiment, the device can include a first flap where the first flap is hinged on one end to allow the flap to rotate about a first hinge as part of a first flapping motion and a first actuator coupled to the first flap which is configured to cause the first flapping motion. Further, the device can include a second flap where the second flap is hinged one end to allow the second flap to rotate about a second hinge as part of a second flapping motion and a second actuator coupled to the second flap configured to cause the second flapping motion. A chamber having an aperture can include a first portion formed from the first flap and a second portion from the second flap. The flaps can be driven at a sufficient rate to cause a synthetic jet to be emitted from the aperture.

In one embodiment, the first flap can be driven at a first frequency and the second flap can be driven at a second frequency. For example, a first frequency can be selected to match a structural resonance associated with the device and a second frequency can be selected to match an acoustic resonance associated with the device. A control system can be configured to vary each of the first and second frequencies as a function of time. For example, at a first time, both flaps can be driven at the acoustic resonance frequency and at a second time the first flap can be driven at the structural resonance frequency and the second flap can be driven at the acoustic resonance frequency.

In a particular embodiment, the device can include a first sidewall and a second sidewall adjacent to first flap and the second flap where the first sidewall and the second sidewall forming a portion of the chamber. One or more sealing mechanisms for preventing fluid from leaking from the chamber can be disposed at interfaces between a) first sidewall and the first and second flap and b) the second sidewall and the first and second flap.

In one embodiment, the first sidewall and the second sidewall may be part of a frame which provides structural support for the device. In another embodiment, the first sidewall and the second sidewall can be formed from a flexible material and each coupled to the first flap and the first flap. The coupling allows the sidewalls to move as the flaps move. The first sidewall and the second sidewall can be configured to flex as the first flap and the second flap move such that work is performed on the fluid within the chamber. This work may improve the efficiency of the device and results in more fluid motion through the aperture when compared to a device with rigid sidewalls.

Another aspect of the described embodiments is related to a method of generating a synthetic jet. The method can be generally characterized as including forming a chamber including an aperture where a portion of the chamber is formed from a first hinged flap, coupling the first hinged flap to a first actuator; and driving the first hinged flap using the actuator such the first hinged flap moves with a flapping motion alternatively causing a fluid to be drawn into the chamber via the aperture and expelled from the chamber via the aperture such that the synthetic jet is emitted from the aperture.

These and other embodiments are described further below with reference to the figures.

BRIEF DESCRIPTION OF THE DRAWINGS

FIGS. 1A are 1B are side view of a bellows synthetic jet including flaps in a first position and a second position, respectively, in accordance with some embodiments.

FIG. 1C is a top view of a flap for a bellows synthetic jet, in accordance with some embodiments.

FIG. 1D is a front view of an aperture for a bellows synthetic jet, in accordance with some embodiments.

FIGS. 2A and 2B are front views of a bellows synthetic jet including a rigid side frame and associated seals in different actuation positions, in accordance with some embodiments.

FIGS. 3A and 3B are front views of a bellows synthetic jet including a flexible sidewall in different actuation positions, in accordance with some embodiments.

DETAILED DESCRIPTION OF EXAMPLE EMBODIMENTS

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

INTRODUCTION

A mechanism for generating a synthetic jet is described. In particular embodiments, an actuator is used to move a hinged flap or multiple actuators are used to move multiple flaps. The flaps act on a fluid within a cavity formed using the flaps. The motion which is generated is similar to the motion associated with a fireplace bellows. Although, a fireplace bellows doesn't generate a synthetic jet. Thus, the mechanism can be referred to as a bellows synthetic jet.

As will be described in more detail below, the bellows synthetic jet can be configured such that the structural resonance of the pumping flap is coupled to the acoustic resonance of the cavity which is provided. For a flap hinged near the jet nozzle, it was found that the acoustic resonance frequency can be primarily a function of the distance from the jet nozzle to the back of the cavity where the pressure increases from the jet nozzle to the back of the cavity. In this configuration, the portion of the cavity where the flap goes through its largest motions, doing the most work, aligns with the areas of highest pressure within the cavity. It is believed this configuration is more efficient than other configurations used to generate a synthetic jet, such as piston-like devices.

As will be described in more details as follows, embodiments of a bellow synthetic jet and its operation are discussed with respect to FIGS. 1A-1D. In particular, with respect to FIG. 1C, some possible shapes that can be utilized for a flap are discussed Further, with respect to FIG. 1D, some possible shapes for a nozzle aperture are described. In FIGS. 2A, 2B, 3A and 3B, bellows synthetic jets with sidewalls configured to perform work or not perform work on the fluid within the cavity are discussed. When flexible sidewalls are used, the sidewalls can be actuated to perform work on the fluid within cavity which may increase the efficiency of the bellows synthetic jet.

Figure 4:
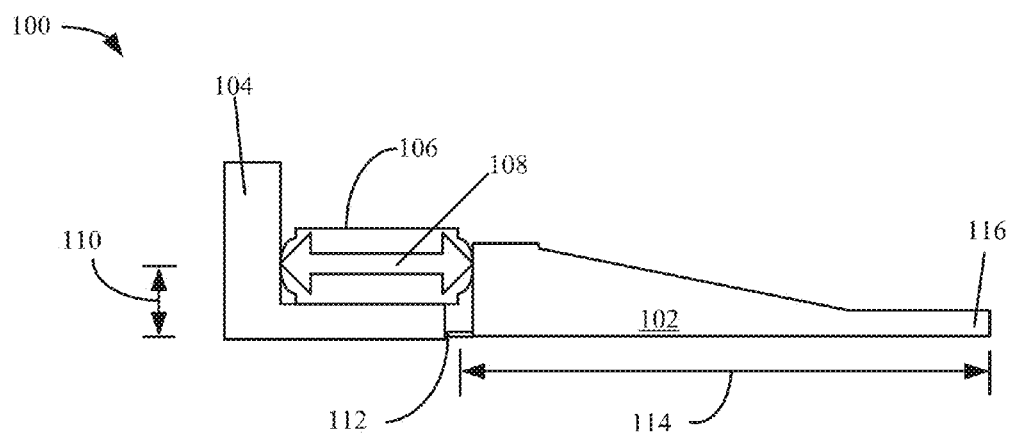
FIG. 4 is a side view of an actuator and flap for a bellows synthetic jet, in accordance with some embodiments.

With respect to FIG. 4, a side view of an actuator coupled to a flap for use in a bellows synthetic jet is described. A prototype of a bellows synthetic jet using the design in FIG. 4 is discussed with respect to FIGS. 5A, 5B and 5C. With respect to FIGS. 6 and 7, the manufacture of an aircraft and an aircraft which can employ one or more bellows synthetic jets is described. Finally, in relation to FIG. 8, a control system which can be used to operate a plurality of bellows synthetic jets in a flow control application is discussed.

Bellows Synthetic Jet Components and Operation

FIGS. 1A are 1B are side views of a simplified version of a bellows synthetic jet 10 including flaps, 16a and 16b, in a first position and a second position, respectively, in accordance with some embodiments. A cavity 14 is formed between the two flaps 16a and 16b, a back wall 24 and two sidewalls (not shown). The sidewalls are discussed with in more detail with respect to FIGS. 2A, 2B, 2C and 2D. An aperture 20 from the cavity 14 allows for fluid to be alternately sucked into and ejected from the cavity 14.

In one embodiment, a cavity 14 can be formed between a single flap, a back wall, sidewalls and a stationary surface opposite the flap. For example, in FIG. 1A, the flap 16b, can be replaced with a stationary surface. Thus, the example shown in FIGS. 1A and 1B is for illustrative purposes and is not meant to be limiting.

The flaps, 16a and 16b, are attached to a hinge mechanisms 18a and 18b, respectively. In one embodiment, one or more actuators (not shown) can be coupled to each of the flaps. The actuators can be used to move the flaps toward each other as shown in 12 or away from one another as shown in 32. In one embodiment, one or more actuators can be coupled to the flaps where the actuators drive the motion in both directions (i.e., the flaps towards each other and away from another). In another embodiment, one or more actuators can be used to drive the motion in one direction and then some other mechanism can be used to provide a restoring force. For example, a spring can be placed between flaps 16a and 16b, which push the flaps apart after the actuators push the flaps together.

In operation, when the flaps, 16a and 16b, move towards one another in 12, the volume of the cavity 14 decreases, and a fluid, such as air, can be expelled from the cavity through aperture 20 as shown in 34. Typically, vortices are ejected from the aperture 20, which interact with the fluid surrounding the aperture to form the synthetic jet. When the flaps 16a and 16b move apart from one another, as shown in 32, the volume of the cavity 14 is increased and fluid is drawn into the cavity.

The flaps 16a and 16b can be moved at a high frequency. For example, the flaps 16a and 16b may each be moved back in forth at a high frequency. As an example, the flaps can be driven at hundreds to thousands of cycles per second. However, this frequency range is but one example and is not meant to be limiting. In one embodiment, the flaps can be moved in phase with one another, i.e., both flaps move together and apart at the same time at the same frequency. In other embodiments, the two flaps can be moved at the same frequency but out of phase with one another or can be moved at different frequencies.

In various embodiments, the frequency at which the flaps operate can be varied during operation. For example, a first frequency of one flap can be selected to match a structural resonance associated with the actuator and a second frequency can be selected to match an acoustic resonance associated with the actuator. A control system can be configured to vary each of the first and second frequencies as a function of time. For example, at a first time, both flaps can be driven at the acoustic resonance frequency and at a second time the first flap can be driven at the structural resonance frequency and the second flap can be driven at the acoustic resonance frequency. These examples are provided for illustrative purposes only as many different frequency values which vary over time can be selected for the first flap and the second flap.

For the mechanism of FIGS. 1A and 1B, the structural resonance of the pumping flap can be coupled to acoustic resonance of the cavity. In one embodiment, this coupling can provide a strong resonant amplification of an already mechanically amplified piezoceramic actuator. In particular, the acoustic pressure distribution 22 can vary from a max on the side of the cavity opposite the aperture 20 to a minimum near the aperture. This distribution is especially favorable for a flap that rotates about a hinge line near the pressure minimum so that the part of the flap 16a or 16b with the highest velocity and greatest range of motion is coincident with the part of the acoustic mode with the highest pressure.

Since coupling between the structural resonance and the acoustic resonance is proportional to the integral of the out-of-plane motion of the structural mode and the collocated acoustic pressure respectively, the rotating flap increases coupling as compared to a uniform flap motion with the same average velocity. Thus, the motion of the flap is high where the pressure is high and low where the pressure is low. In a traditional synthetic jet design, where a disk at the bottom of a cylinder, such as a piezoelectric disk, is actuated, the axisymmetric shape of the disk prevents taking advantage of this phenomenon. Thus, the coupling effect found with the bellows design doesn't come into play.

An analysis of various configurations, such as the one shown in FIGS. 1A and 1B, was performed using a detailed structural/acoustic model. It was found for devices with the same average velocity of the pumping mechanism and the same nozzle and output aperture, the bellows synthetic jet mechanism has the potential to provide a higher velocity synthetic jet than a diaphragm-based device (e.g., a device a cylinder with an actuated circular piston, such as a piezoelectric disk). Further, for certain flap designs, a higher coupled flap frequency is obtainable as compared to a circular diaphragm. The higher coupled flap frequency can contribute to a higher jet velocity and result in a relatively more efficient device.

Next, flap and aperture shapes are discussed. FIG. 1C is a top view of a flap 40 for a bellows synthetic jet, in accordance with some embodiments. The flap 40 includes a top side 42a, a bottom side 42b connected by sidewalls 44a and 44b. Typically, the flap 40 can be hinged alongside 42a or side 42b. The flap angle 46 associated with the sidewalls can be up to 90 degrees to provide a rectangular flap. When the flap angle 46 is less than 90 degrees, the shape can cause the flow to converge into the nozzle (e.g., see aperture 20 in FIGS. 1A and 1B or aperture 56 in FIG. 1D), which may improve the efficiency of the device. In general, for a flap shape, a hinge line can be provided and then a shape, such as a shape symmetric about a line perpendicular to the hinge line, can extend from the hinge line.

Different flap shapes were compared as possible flap configurations and the performance of each shape assessed. The flap shapes each had a constant area. One characteristic length of the shapes is a maximum distance from the nozzle aperture. It was found that the acoustic resonance frequency can be primarily a function of the distance from the nozzle aperture to the back of the cavity. Further, it was found that some shapes with a smaller characteristic length and hence a higher acoustic frequency as compared to shapes of the same area with a larger characteristic length and larger acoustic frequency can achieve a lower structural resonance frequency, which is related to the time it takes the flap to cycle through it motion. A flap design with a higher structural resonant frequency can result in a more efficient generation of a synthetic jet.

FIG. 1D is a front view 40 of a bellows synthetic jet including the jet nozzle aperture 52 and, in accordance with some embodiments. The nozzle aperture 52 is a rectangular slit with short sides 54a and 54b joined by long sides 56a and 56b. In alternative embodiments, the height of the aperture can vary between sides 54a and 54b. Further, the shape of the aperture 52 can include one or more curved portions. In yet another embodiment, rather being a single contiguous opening, the aperture 52 can be a group of openings, such as a number of circular openings arranged in a line or some other pattern.

As described above, the bellows synthetic jet includes a cavity where portions of the cavity are formed by one or more flaps. In some embodiments, the sidewalls of the cavity adjacent to the one or more flaps can be configured to perform work or not perform on the fluid within the cavity. Two examples illustrating these configurations are described as follows with respect to FIGS. 2A, 2B, 3A and 3B.

FIGS. 2A and 2B are front views of portions of a bellows synthetic jet 60 including a rigid side frame 64 and associated seals, such as 66a and 66b, in different actuation positions, in accordance with some embodiments. The bellows synthetic jet includes two flaps, 62a and 62b, which move towards and apart from one another to perform work on a fluid between the flaps. As described above, the two flaps, 62a and 62b, can be hinged. A sidewall 64, which can be formed from a rigid or semi-rigid material, is located adjacent to the flaps, 62a and 62b. In one embodiment, the sidewall can be part of a structural frame used to provide structural support for the bellows synthetic jet 60.

A sealing mechanism can be utilized to prevent fluid leakage at the interface between the sidewall 64 and the flaps, 62a and 62b. In one embodiment, the sealing mechanism can be a flexible membrane, such as 66a and 66b. The sealing membranes, 66a and 66b, can be coupled to the sidewall 64 along a length of the flaps 62a and 62b which extends to the hinge line. As the flaps, 62a and 62b, move towards and away from one another, the membranes, 66a and 66b, can stretch or contract to maintain the seals. In this configuration, the seals, 66a and 66b, do a minimal amount of work on the fluid in the cavity between the flaps, 62a and 62b.

In another embodiment, as discussed as follows, a bellows synthetic jet can be configured such that the sidewalls adjacent the one or more flaps perform some work on the fluid in the cavity. FIGS. 3A and 3B are front views of a portion of a bellows synthetic jet 80 including a flexible sidewall 84 in different actuation positions, in accordance with some embodiments. The two flaps, 82a and 82b, move closer and apart from one another as shown in FIGS. 3A and 3B.

The two flaps are joined together via a flexible membrane 84. The flexible membrane 84 is configured to bow inwards as the two flaps, 82a and 82b, move towards one another. The bowing motion reduces a volume of the cavity between the flaps to perform work on the fluid in the cavity. The additional work performed by the sidewalls may increase the overall efficiency of the device.

Example Bellows Synthetic Jet

In this section, an example of a bellows synthetic jet is described. In particular, a flap and actuator configurations are discussed with respect to FIG. 4 and its incorporation into a bellows synthetic jet is described with respect to FIGS. 5A, 5B and 5C. These configurations are discussed for the purposes of illustration only and are not meant to be limiting.

FIG. 4 is a side view of an actuator 106 and flap 102 configuration for a bellows synthetic jet 100. In one embodiment, the flap 102 can be formed from a rigid light-weight material. The flap 102 has a length 114. The thickness of the flap 102 varies along the length 114.

An actuator 106 is in contact with the flap at a height 110 and anchored to support structure 104. The actuator 106 is designed to expand and contract. When the actuator expands 108, the tip 116 of the flap 102 moves downward as the flap 102 rotates around hinge mechanism 112. When the actuator contracts the tip 116 moves upwards as the flap 102 rotates in the opposite direction around hinge mechanism 112. A flapping motion is generated as the actuator is repeatedly activated. The up and down motion of the tip 116 can be mechanically amplified according to the ratio of length 114 to the height 110. The expansion and contraction of the actuator 106 can occur at a high frequency, such as at a frequency between 200 and 2000 HZ. A synthetic jet may not form until some minimum frequency is reached.

In one embodiment, the actuator 106 can be formed from a piezoelectric material. For example, the actuator 106 can be a piezoceramic stack actuator. One advantage of piezoceramic stack actuator is it has a minimal amount of moving parts. However, other types of actuator can be utilized and the example of an actuator using a piezoelectric material is provided from the purposes of illustration only.

Figure 5A:
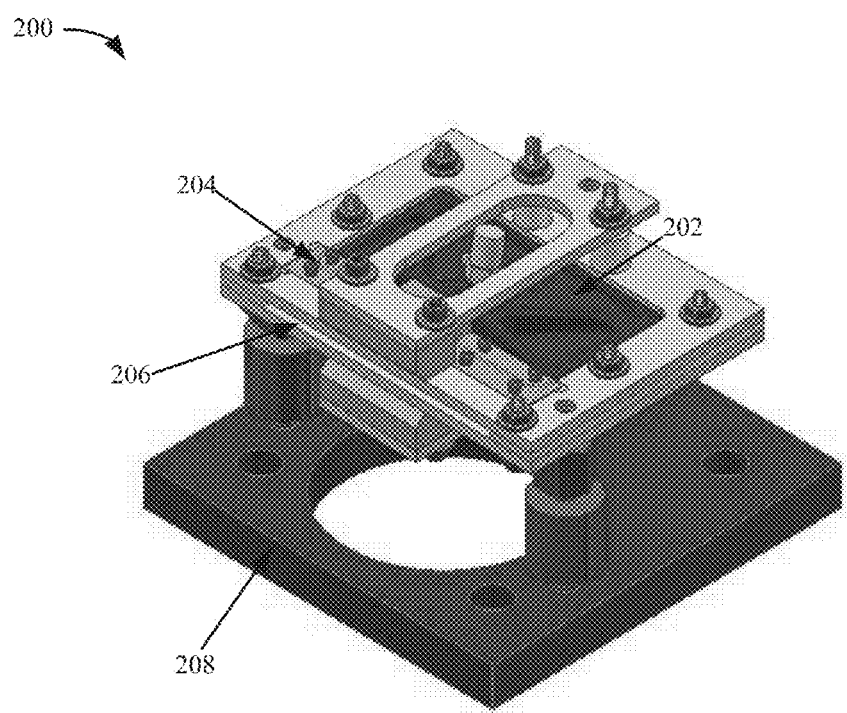
FIG. 5A is perspective view of a bellows synthetic jet, in accordance with some embodiments.

Next, an example of bellows synthetic jet including a flap/actuator configuration similar to the one discussed with respect to FIG. 4 is described. FIG. 5A is perspective view of a bellows synthetic jet 200, in accordance with some embodiments. The bellows synthetic jet 200 includes to flap and actuator mechanisms which arranged opposite one another to form a cavity. The cavity includes an exit aperture 206. In this example, the sidewalls of the cavity are rigid and are not configured to perform work on the fluid within the cavity.

The top upper flap 200 is visible. The upper flap 204 is configured to rotate around a hinge line 204 near aperture 206. The support structure for the flaps is anchored to base 208. When actuated, a tip of the flap moves towards and away from the base 208.

Figure 5B:
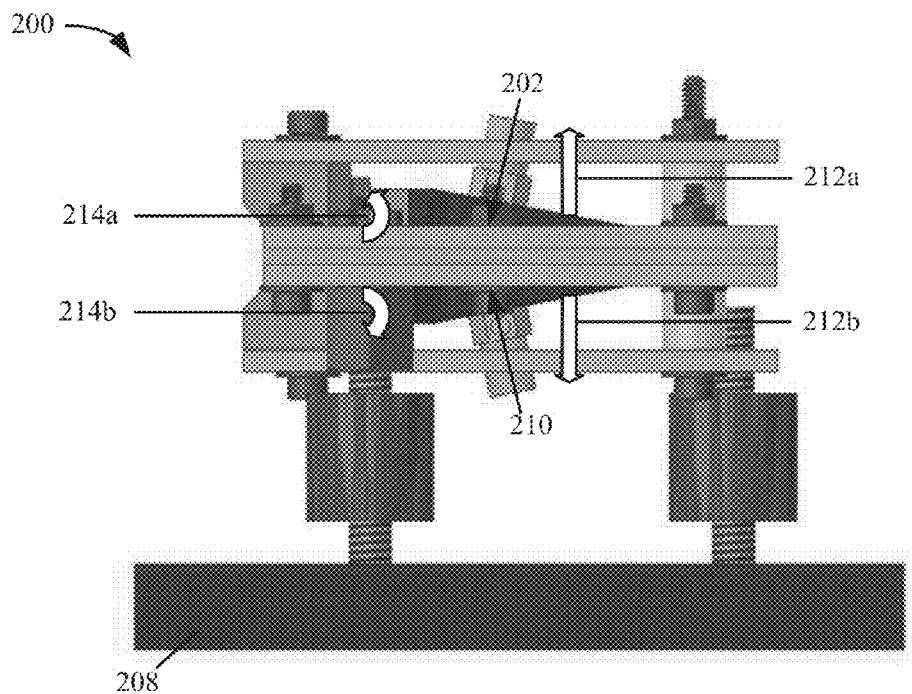
FIG. 5B is a side view of a bellows synthetic jet, in accordance with some embodiments.

FIG. 5B is a side view of a bellows synthetic jet 200, in accordance with some embodiments. The two flaps 202 and 210 are arranged opposite one another. Flap 202 is configured to rotate about an axis through point 214a and flap 210 is configured to rotate about an axis 214b.

In operation, the two flaps, 202 and 210 move towards and away from one another. In FIG. 5B, the two flaps are shown at a position where the tips are at a minimum distance from one another. In this position, the bottom surfaces of flaps 202 and 210 are proximately parallel to one another. From this position, flap 202 moves in direction 212a and flap 210 moves in direction 212b. In alternate embodiments, the flaps can be configured to move past the parallel position to reach the minimum distance between the tips or stop and move apart before the parallel position is reached.

Figure 5C:
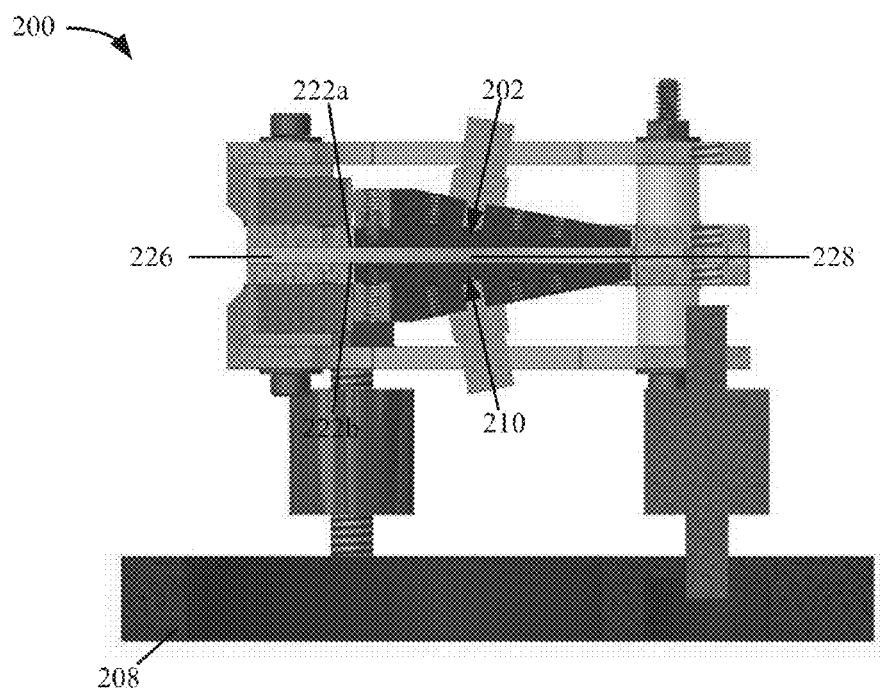
FIG. 5C is a cross-sectional view of a bellows synthetic jet, in accordance with some embodiments.

FIG. 5C is a cross-sectional view of a bellows synthetic jet 200, in accordance with some embodiments. In FIG. 5C, the cross-sections of flaps 202 and 210 and actuators 224a and 224b shown. The flaps 202 and 210 are coupled to hinge mechanisms, 222a and 222b. In one example, the hinge mechanisms, 222a and 222b, can be formed from a flexible material, such as a strip of metal. In other examples, more mechanically complex hinge mechanisms can be utilized. When a strip of material is used as a hinge mechanism, the flaps 202 and 210 can be bonded to their respective hinge mechanisms. For example, depending on the materials for the flap and hinge, the flaps can be bonded using an adhesive, solder or some other bonding agent.

A cavity 228 is formed between the two flaps in this position. The cavity 228 is in fluid communication with nozzle 226. Fluid outside of the bellows synthetic jet 200 can be drawn through the nozzle 226 into the cavity 228 when the flaps, 202 and 210, move away from one another. When the flaps, 202 and 210, move towards one another fluid in cavity 228 can enter nozzle 226 and exit through aperture 206 as shown in FIG. 5A.

Examples of Aircrafts

Figure 6:
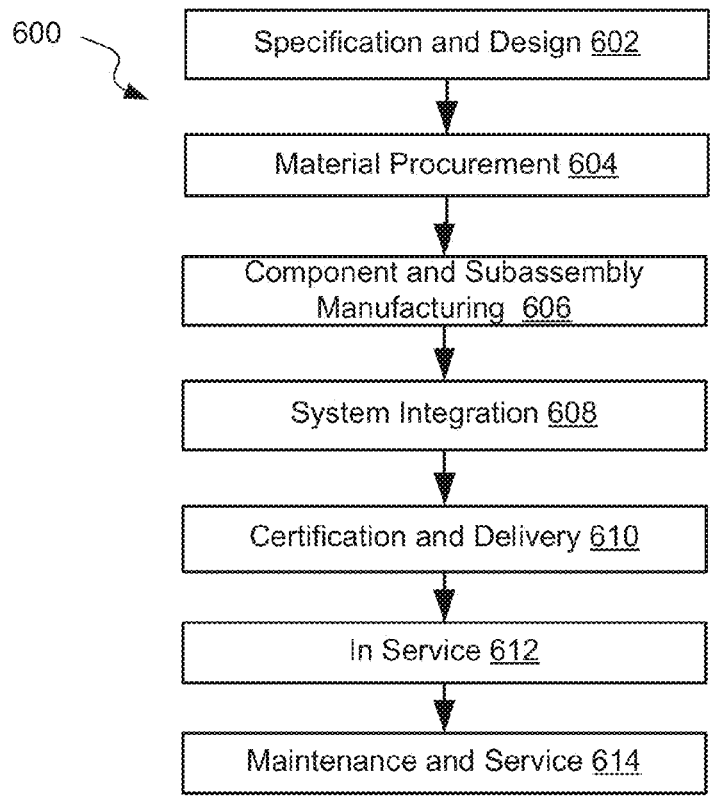
FIG. 6 is a process flowchart reflecting key operations in aircraft manufacturing and service, in accordance with some embodiments.

An aircraft manufacturing and service method 600 shown in FIG. 6 and an aircraft 630 shown in FIG. 7 will now be described to better illustrate various features of processes and systems presented herein. The aircraft may utilize embodiments of the bellow synthetic jet, such as for flow control over a wing. During pre-production, aircraft manufacturing and service method 600 may include specification and design 602 of aircraft 630 and material procurement 604. The production phase involves component and subassembly manufacturing 606 and system integration 608 of aircraft 630. Thereafter, aircraft 630 may go through certification and delivery 610 in order to be placed in service 612. While in service by a customer, aircraft 630 is scheduled for routine maintenance and service 614 (which may also include modification, reconfiguration, refurbishment, and so on). While the embodiments described herein relate generally to servicing of commercial aircraft, they may be practiced at other stages of the aircraft manufacturing and service method 600.

Each of the processes of aircraft manufacturing and service method 600 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

Figure 7:
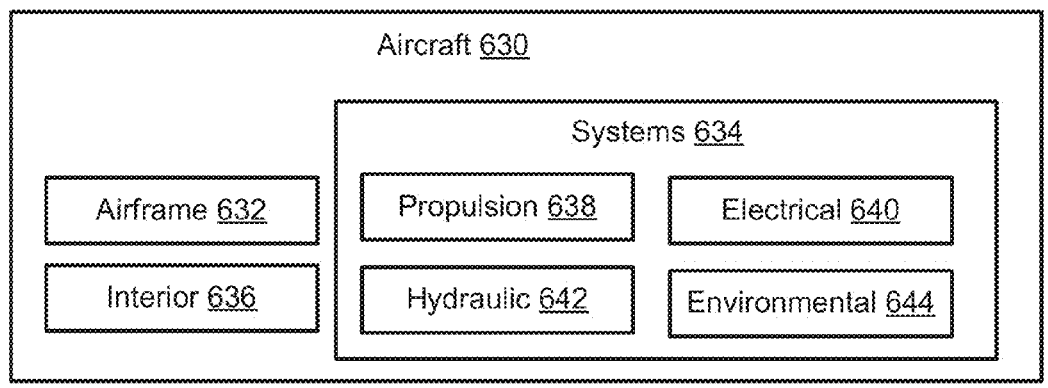
FIG. 7 is a block diagram illustrating various key components of an aircraft, in accordance with some embodiments.

As shown in FIG. 7, aircraft 630 produced by aircraft manufacturing and service method 600 may include airframe 632, interior 636, and multiple systems 634 and interior 636. Examples of systems 634 include one or more of propulsion system 638, electrical system 640, hydraulic system 642, and environmental system 644. Any number of other systems may be included in this example. Although an aircraft example is shown, the principles of the disclosure may be applied to other industries, such as the automotive industry.

Apparatus and methods embodied herein may be employed during any one or more of the stages of aircraft manufacturing and service method 600. For example, without limitation, components or subassemblies corresponding to component and subassembly manufacturing 606 may be fabricated or manufactured in a manner similar to components or subassemblies produced while aircraft 630 is in service.

Also, one or more apparatus embodiments, method embodiments, or a combination thereof may be utilized during component and subassembly manufacturing 606 and system integration 608, for example, without limitation, by substantially expediting assembly of or reducing the cost of aircraft 630. Similarly, one or more of apparatus embodiments, method embodiments, or a combination thereof may be utilized while aircraft 630 is in service, for example, without limitation, to maintenance and service 614 may be used during system integration 608 and/or maintenance and service 614 to determine whether parts may be connected and/or mated to each other.

Examples of Controller Computer Systems

Figure 8:
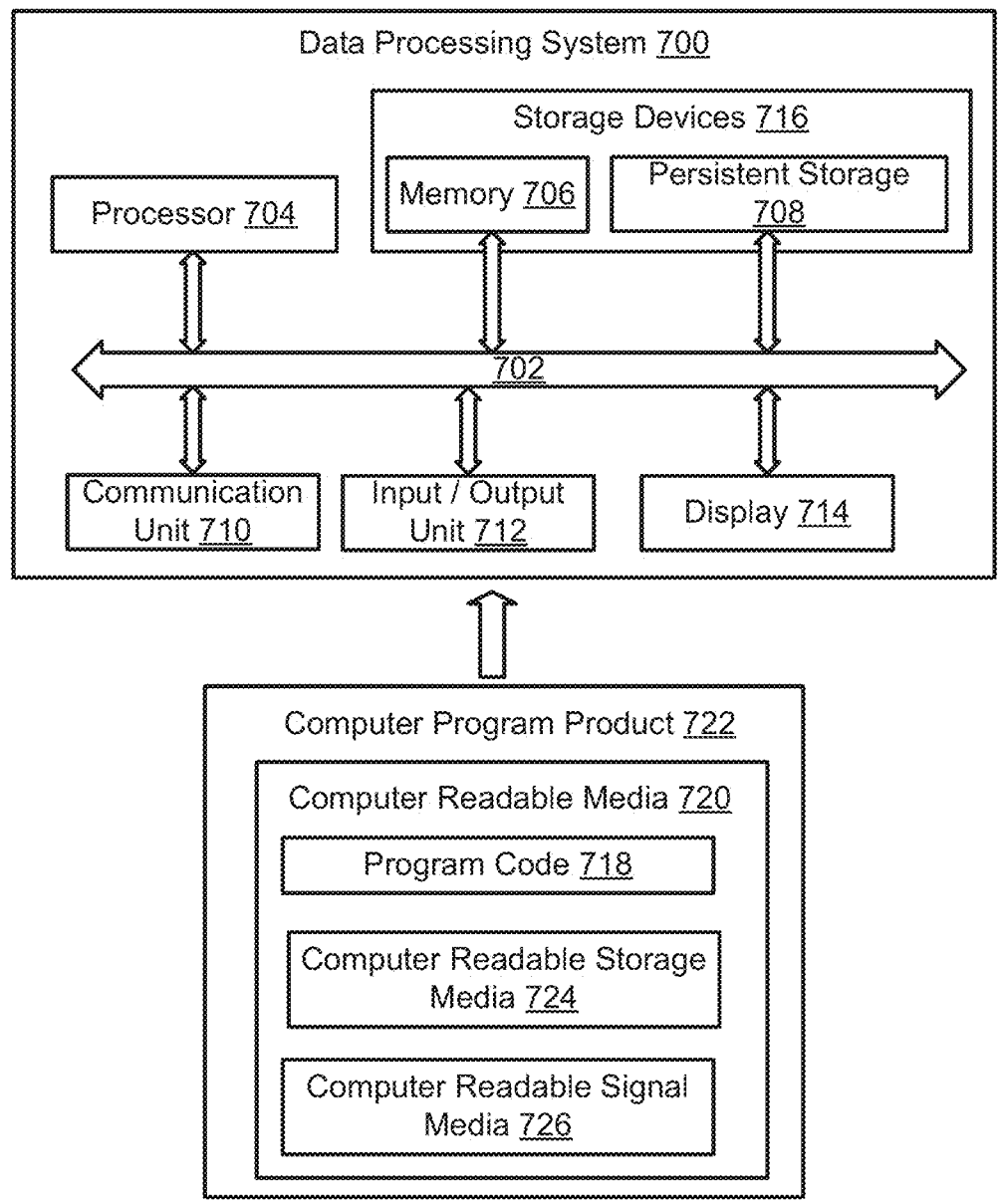
FIG. 8 is a block diagram illustrating a data processing system, in accordance with some embodiments.

Turning now to FIG. 8, an illustration of a data processing system 700 is depicted in accordance with some embodiments. In one embodiment, the data processing system can be used to control operation of one or more bellows synthetic jets. Data processing system 700 may be used to implement one or more computers used in a controller or other components of various systems described above. In some embodiments, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these illustrative examples. Memory 706, in these examples, may be, for example, a random access memory or any other suitable volatile or non-volatile storage device. Persistent storage 708 may take various forms, depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these illustrative examples. In one example, computer readable media 720 may be computer readable storage media 724 or computer readable signal media 726.

In these illustrative examples, computer readable storage media 724 is a physical or tangible storage device used to store program code 718 rather than a medium that propagates or transmits program code 718.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code 718.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A device for generating a synthetic jet comprising,
a rigid flap including a first end and a second end wherein the rigid flap is hinged on one of the first end or the second end to allow the flap to rotate about a hinge as part of a flapping motion;
an actuator coupled to the rigid flap configured to cause the flapping motion; and
a chamber including an aperture in a front portion, a back portion, a top portion, a bottom portion and side portions, said top portion, said bottom portion and said side portions extending between the front portion and the back portion, wherein the top portion or the bottom portion of the chamber is formed from one side of the rigid flap wherein the rigid flap is configured such that the flapping motion alternately causes a fluid to be drawn into the chamber via the aperture and expelled from the chamber via the aperture such that the synthetic jet is emitted from the aperture wherein the flapping motion causes a pressure distribution to form which increases from a minimum value at approximately the aperture to a maximum value near the back portion of the chamber opposite the aperture in the front portion.

2. The device of claim 1, wherein the rigid flap is hinged such that portions of the rigid flap with greatest range of motion are located in portions of the chamber near the maximum value of the pressure distribution.

3. The device of claim 1, wherein the rigid flap is rectangularly shaped.

4. The device of claim 1, wherein the rigid flap is trapezoidally shaped.

5. The device of claim 1, wherein the actuator includes a piezoelectric material which expands and contracts to generate the flapping motion.

6. The device of claim 1, wherein the device is coupled to an aircraft for altering aerodynamic performance of the aircraft.

7. A device for generating a synthetic jet comprising:
- a first rigid flap including a first end and a second end wherein the first rigid flap is hinged on one of the first end or the second end to allow the first rigid flap to rotate about a first hinge as part of a first flapping motion;
- a first actuator coupled to the first rigid flap configured to cause the first flapping motion;
- a second rigid flap including a third end and a fourth end wherein the second rigid flap is hinged on one of the third end or the fourth end to allow the second rigid flap to rotate about a second hinge as part of a second flapping motion;
- a second actuator coupled to the second rigid flap configured to cause the second flapping motion;
- wherein a first axis of rotation of the first hinge and a second axis of rotation of a second hinge are approximately parallel; and
- a chamber including an aperture where a first portion of the walls of the chamber is formed from one side of the first rigid flap and a second portion of the walls of the chamber is formed from one side of the second rigid flap wherein, when driven at a sufficient rate, the first flapping motion and the second flapping motion cause a synthetic jet to be emitted from the aperture.

8. The device of claim 7, wherein the first rigid flap is driven at a first frequency and the second rigid flap is driven at a second frequency different from the first frequency.

9. The device of claim 8, wherein the first frequency or the second frequency is selected to match a structural resonance associated with the device or an acoustic resonance associated with the device.

10. The device of claim 7, further comprising a first sidewall and a second sidewall adjacent to first rigid flap and the second rigid flap, the first sidewall and the second sidewall forming a portion of the chamber.

11. The device of claim 10, further comprising one or more sealing mechanisms for preventing fluid from leaking from the chamber at interfaces between a) first sidewall and the first and second rigid flap and b) the second sidewall and the first rigid and second rigid flap.

12. The device of claim 10 wherein the first sidewall and the second sidewall are part of a frame which provides structural support for the device.

13. The device of claim 10 wherein the first sidewall and the second sidewall are formed from a flexible material and each coupled to the first rigid flap and the second rigid flap.

14. The device of claim 10 wherein the first sidewall and the second sidewall are configured to flex as the first flap and the second flap move such that work is performed on the fluid within the chamber.

15. The device of claim 7, wherein the first flap and the second flap are each hinged near the aperture of the chamber.

16. A device for generating a synthetic jet comprising,
- a flexible first side wall coupled to a rigid flap on a first side and a rigid member on a second side;
- a flexible second side wall coupled to the rigid flap on a third side and the rigid member of a fourth side;
- the rigid flap, including a first end and a second end, wherein the rigid flap is hinged on one of the first end or the second end to allow the flap to rotate about a hinge as part of a flapping motion and move relative to the rigid member;
- an actuator coupled to the rigid flap configured to cause the flapping motion; and
- a chamber including an aperture wherein a portion of walls the chamber is formed from one side of the rigid flap, one side of the flexible first sidewall, one side of the flexible second side wall and one side of the rigid member and wherein the flap is configured such that the flapping motion alternately causes a fluid to be drawn into the chamber via the aperture and expelled from the chamber via the aperture such that the synthetic jet is emitted from the aperture.

17. The device of claim 16, wherein the flexible first sidewall and the second flexible sidewall are configured to flex as the rigid flap moves such that work is performed on the fluid within the chamber.

18. The device of claim 16, wherein the first flap is hinged near the aperture of the chamber.

* * * * *